Patented Dec. 9, 1947

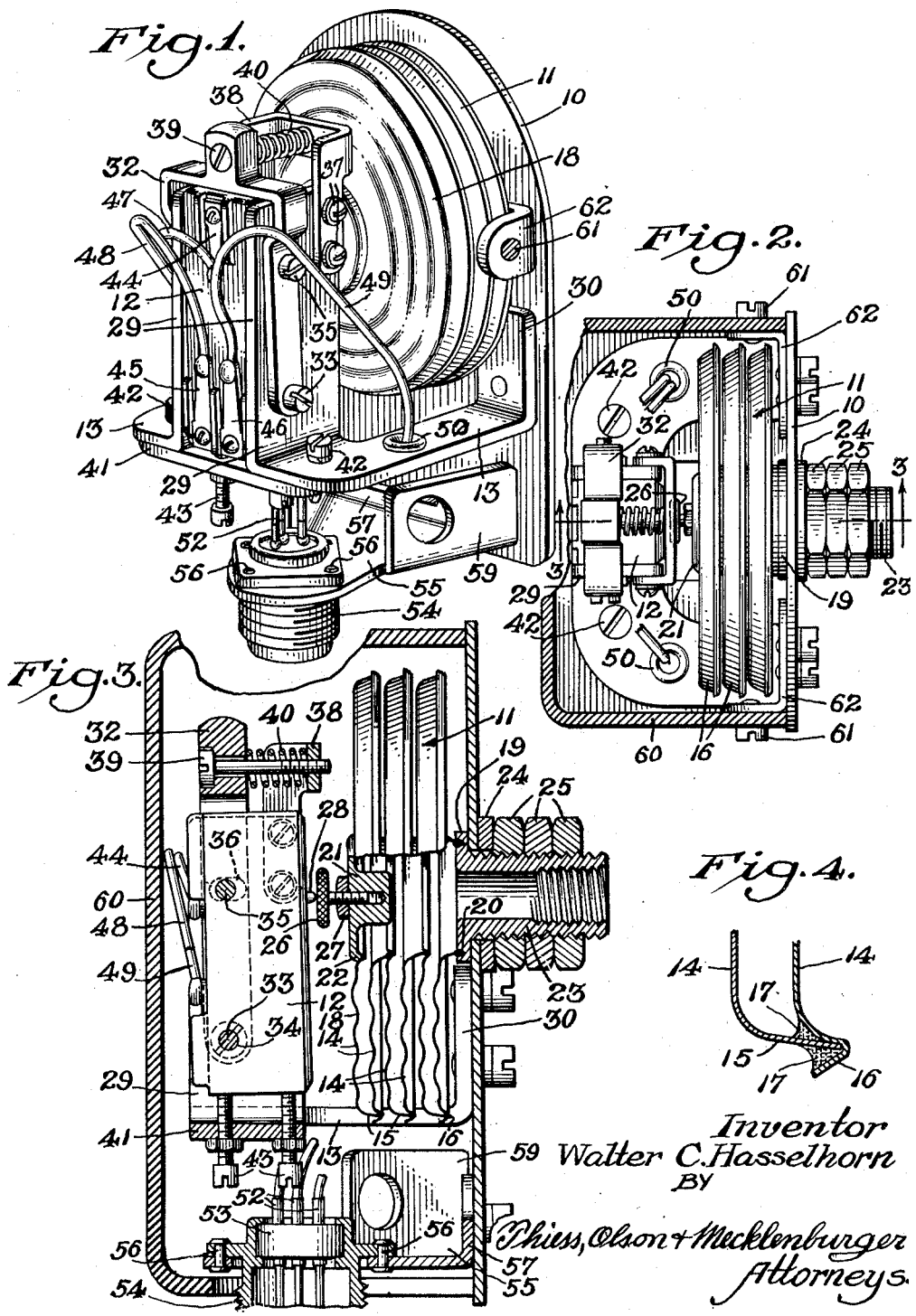

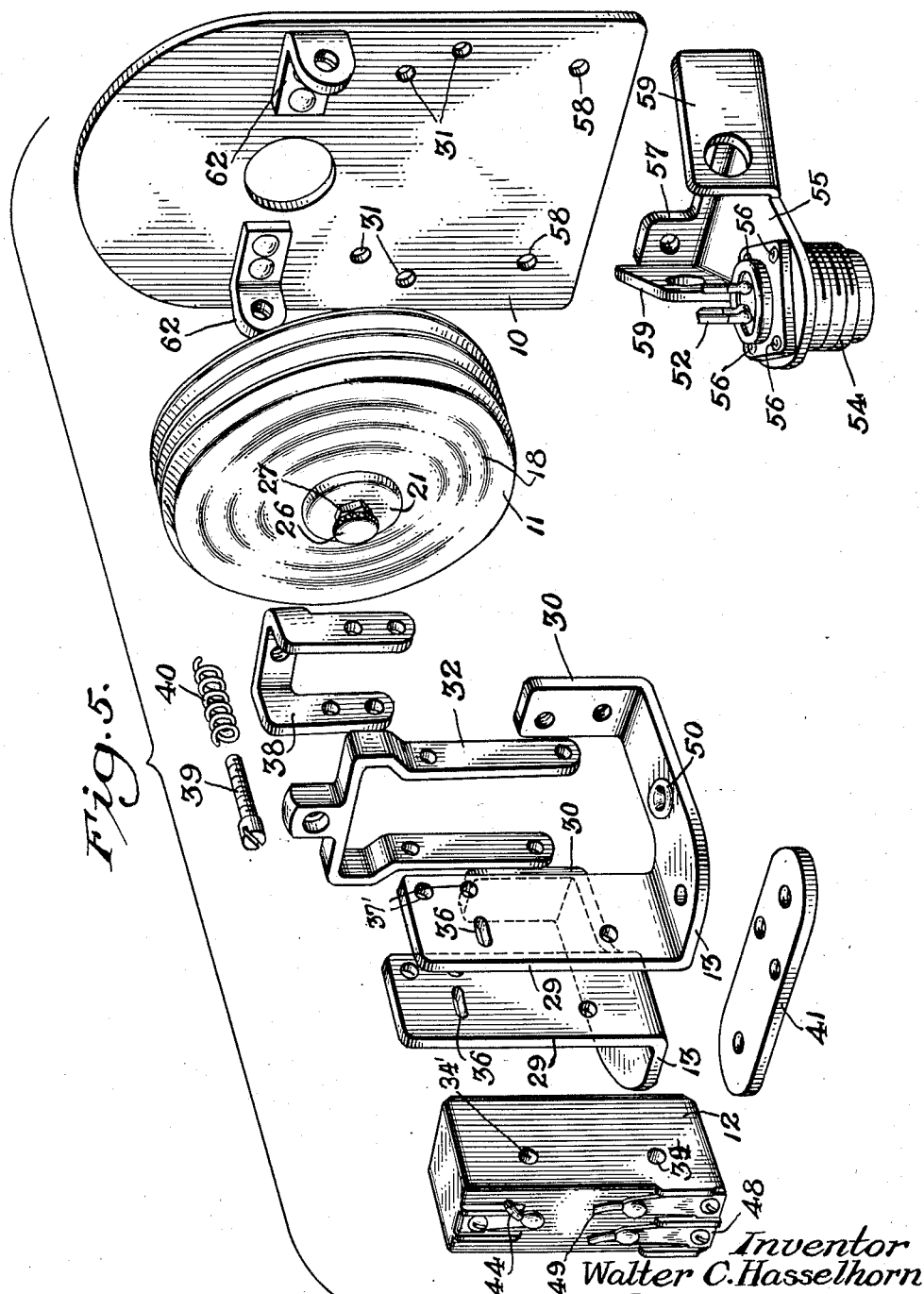

2,432,312

UNITED STATES PATENT OFFICE 2,432,312

PRESSURE SWITCH

Walter C. Hasselhorn, Chicago, Ill., assignor to Cook Electric Company, Chicago, Ill., a corporation of Illinois Application August 21, 1944, Serial No. 550,390

8 Claims. (Cl. 200—83)

This invention relates to a pressure switch in which a pressure-responsive element operates switch contacts to effect control of one or more actuating elements.

The pressure switch disclosed herein is particularly intended for use where extreme sensitivity is desired, it being an object of the invention to produce a structure which is capable of consistent and continuous operation on small increments or differentials of pressure and to do this invariably regardless of temperature changes or vibration.

A further object of the invention is to provide a new design of pressure switch adapted to embody certain improved structural features and effect a novel relation of such features whereby to produce an extremely sensitive response to pressure change.

The invention is designed to eliminate difficulties heretofore experienced in securing sensitive operation of a pressure switch so that vibration and temperature changes, as well as other extraneous influences, will not affect actuation even when extremely slight differentials are desired. This may be accomplished primarily by arranging the parts in a novel manner whereby the stroke required may be finely calibrated to meet varying conditions of operation of the actuating elements to be controlled. Calibration to produce extreme sensitivity may be obtained by a predetermined normal loading of the switch member whereby the force or motion required to operate the switch is accordingly reduced and only a small part of this force or motion need be used to effect operation. Consequently, a predetermined adjustment in calibration providing such loading will compel operation by exceedingly small increments of pressure and thereby provide sensitivity of any desired degree.

For example, an over-center snap switch may be used and a pressure-responsive element, whether of a single or multiple diaphragm type, associated therewith. The type of over-center snap switch may be one normally designed to operate, say, upon a four ounce pressure differential. When used as disclosed herein, this differential may be reduced by an adjustment of the switch mounting to impose a normal pressure load thereon so that the operating force to effect operation of the switch by the pressure-responsive element need not exceed ½ inch water column, or .018 pound per square inch of pressure, or .0125 pound of dead weight. Insofar as the results obtained from this specific example of one embodiment of the invention are novel and useful for this type of device, the limits mentioned have particular utility. It will be understood, however, that other embodiments of the invention may operate at other limits, as for example, I find that adjustments to actuate from 1 inch to 30 inches of water column may be provided for the structure disclosed herein.

A further object of the invention is the provision of fine, accurate and rugged positioning means for the cooperating parts of the instruments for their accurate relative positioning for such sensitive dimensional response to small increments of pressure.

In carrying out the invention in its more specific form, a pressure bellows sensitive to such small increments of pressure is combined and cooperatively related with a sensitive snap switch in a single, rugged, composite self-contained structure, instrument or device, in which the cooperating parts are capable of being positionably related with finest accuracy for such delicate responsiveness and at the same time being capable of withstanding rough handling, vibration, installation in any position, and indefinite maintenance of the delicate operative positioning of its parts.

Other objects and advantages will appear from the detailed description and claims to follow, in connection with the accompanying drawings which illustrate an embodiment of the invention, and in which Fig. 1 is a perspective view of a pressure switch embodying the invention, with the cover removed;

Fig. 2 is a plan view of the same with the cover partly broken away and the remainder in section;

Fig. 3 is a central vertical section on the line 3—3 of Fig. 2, parts, however, not being sectioned;

Fig. 4 is a detail section of the bellows joint; and

Fig. 5 is an exploded view of the switch, the elements being shown in perspective.

As herein shown, the device includes a flat metal back plate 10, a sensitive bellows 11 secured to the upper front face of plate 10, and a sensitive pressure-responsive switch 12 supported by brackets 13 in front of the bellows for operation thereby, these brackets 13 being secured at their inner ends to the back plate 10.

The bellows consists of a plurality of diaphragms 14, Fig. 3, centrally apertured and joined alternately at their inside and outside peripheral edges. Diaphragms 14 are preferably arranged in pairs joined together at their outer edges to form what may be termed as flanges which make up the bellows in its entirety.

Each diaphragm is cupped as at 15, Fig. 4, and the edge dips into the gutter 16 at the edge of the adjacent diaphragm. Solder 17 is flowed into the gutter both inside and outside of the cupped rim 15 to produce a solid joint which is protected from the strain of bending. The diaphragms, thus, in operation under pressure, operate with a cantilever action from the inner and outer periphery of their flat sections and without flexing the joints.

The diaphragms 14 are corrugated by concentric grooves or depression rings 18 on their flat surfaces for extreme sensitivity or flexibility for low pressure applications. A suitable spring metal of proper thickness and temper is used.

The diaphragms are connected to inner and outer end fittings in a similar manner. Thus the inner fitting 19 is provided with a V-groove 20 into which the inner peripheral edge of the adjacent diaphragm 14 seats, and this groove is filled with solder so that a firm joint is made. In the case of the outer or front fitting 21, the V-groove is formed at the inner peripheral edge of the diaphragm and the plate is formed with a sharp annular edge 22 seating in the groove, the latter being flowed full of solder as indicated.

The rear fitting 19 has a tubular extension 23 extending through the back plate 10 and is firmly secured thereto by a lock washer 24 and nut 25 threaded thereon, thus clamping the bellows to the back plate. This tubular extension is threaded both externally and internally for any suitable connection to the pressure source, and admits the pressure fluid, whether air, gas, steam, water or other fluid, to the bellows for its operation.

The inner or front fitting of the bellows is provided with an adjustable contact button 26 having a smooth wide face and knurled edge and is threaded into the end fitting 21 with a lock nut 27 thereon. The face of button 26 engages and operates the actuating pin 28 of the switch and may be adjusted in position therefor by the fine adjustment of the threads on the stem of the button 26 and in the end fitting, such adjusting being maintained by the lock nut 27. The broad face of the push-button insures proper operation of switch pin 28, even though in the finally adjusted assemblage the pin and button may not be in precise axial alignment.

The switch 12 is designed to be extremely sensitive in operation through the application of slight pressure against pin 28 projecting through the cover or side wall of the switch casing near one end. This type of switch is characterized by a snap spring switch member or members inside the insulating casing which are operated with a snap action by an extremely slight pressure and movement of the push pin. It may be of the design and structure shown for example in United States Letters Patent No. 1,960,020.

As here depicted, the switch 12 includes an oblong insulating, enclosing casing substantially square in cross section which is supported in a vertical position by and between the upwardly projecting flat arms or end portions 29 of two brackets 13 which are bent and curved backwardly and then upwardly, as at 30, and secured by screws and lock washers to the back plate 10. Tapped openings 31, as shown in Fig. 5, are provided in the back plate to receive the screws which thread into the foot 30 of the brackets 13. These supporting brackets thus provide a rigid support for the switch on the back plate.

An adjusting yoke 32 passes down over the ends of arms or risers 29 of brackets 13 and over the end of the switch 12 with its legs lying flatly against the outer faces of the risers. A pivot and clamping bolt 33 extends through holes in lower ends of these yoke legs and through a hole 34 in the switch casing 12 and serves as a pivot for the switch and yoke when the upper end of the switch is adjusted toward and away from the bellows. A lock washer and nut on the threaded end of the bolt 33 enables the bolt to clamp the yoke legs, the bracket risers and the switch firmly together when the switch has been finally adjusted in position.

A similar bolt 35 passes through these same parts at or near the upper ends of the risers and enters switch 12 at hole 34', but in this instance the bolt holes in the risers 29 of brackets 13 are slotted as at 36 to permit the bolt to move therein when the yoke and switch are adjusted toward and away from the bellows. Here again the end of the bolt is equipped with a suitable lock washer and nut to enable the parts to be firmly clamped together at this point when the switch shall have been finally adjusted in its working position.

In order to move the switch 12 so that its operating pin 28 shall properly cooperate with and be operated by button 26 of the bellows, a second yoke member 38 is firmly secured by screws 37, or otherwise, to the upper ends of the risers 29 of brackets 13, the screws 37 threading into openings 37' in these risers 29. An adjusting screw 39 extends between the two yoke members 32 and 38. The head of screw 39 is shouldered in an upward extension of the cross-member of yoke 32 and is threaded into the cross-member of the yoke 38, and a strong coil spring 40 surrounds the screw and presses outwardly against the two yokes at its ends. By this means, a tightening of the screw 39 moves the upper ends of the yoke 32 and the switch 12 toward the bellows against the tension of spring 40, the bolts 33 and 35 being unclamped. A loosening of the screw 39 results in the yoke and switch being moved by the spring 40 in the reverse direction. In this way the switch 12 and operating pin can be positioned with substantially micrometer accuracy for functioning with the contact button 26 of the bellows.

In this connection, it will be observed that the operating force or motion of bellows 18 necessary to effect operation of switch 12 can be varied to a point where extremely small pressure increments as low as .018 pound per square inch may be effectively used. For example, switch 12 may be of a capacity to operate when a total pressure of 14 ounces is applied to switch pin 28 and to release when the pressure is reduced to approximately 10 ounces, thus leaving a 4-ounce operating differential. This 4-ounce operating differential may be reduced, however, by the structure disclosed herein so that any predetermined operating increment of pressure can be used to effect the operating stroke of switch pin 28. This may be obtained by the adjustment of screw 39 to bring switch pin 28 to bear against bellows button 26, the amount of pressure exerted being the force reducing the unimpeded operating differential of the switch 12, which according to the example stated above may be 4 ounces. In other words, the spring tension of the bellows 11 may be utilized to load switch 12, so to speak, to any degree so that smaller increments of pressure acting internally within bellows 11 will complete the operating stroke of switch pin 28. While the relation of the parts of the structure shown herein appear simple, a decidedly fine calibration can be obtained. The limits set forth above are given only as an illustration of the results obtainable by this structure, it being understood that other limits may also be employed.

It will also be noted that such loading of switch 12 has a further advantage of preventing vibration from affecting the operation inasmuch as switch pin 28 is thus held against the bellows 11 and is not free to be moved by accidental jarring.

In order further to ensure the rigidity of the parts and the holding of the switch in place, a short strap or plate 41 is secured by screws 42 and lock washers near its ends to the under side of the two brackets 13 beneath the risers 29. This plate 41 spans the space beneath the switch 12 and two tightening and adjusting screws 43 provided with lock nuts are threaded upwardly therethrough to bear at their upper ends against the bottom end of the switch casing 12. By tightening these screws against the switch it is firmly clamped in posiion even though the lower clamping bolt 33 may not tightly clamp it, and it is proof against loosening by vibration or otherwise. The lock nuts prevent the screws 43 from working loose.

The switch 12 in this instance is provided with three outside terminal connections 44, 45 and 46 which are suitably connected with the switch contacts inside the casing and are soldered to covered wires 47, 48 and 49 which are carried down through insulating ferrules 50 in holes in the horizontal portions of brackets 13. From there they lead to the upper ends of contact posts 52 to which they may be respectively soldered or otherwise connected. These contact posts 52 are mounted in and pass through an insulating block 53 seating at its edges in a connection sleeve or socket member 54, the upper end of the sleeve being turned in over the block after its insertion therein.

This sleeve or socket 54 is carried in a supporting bracket 55 attached to the back plate 10 of the relay, its projecting flange being riveted to the bracket at the four corners by rivets 56.

The lower ends of the posts 52 form socket terminals for connection with the contacts of a plug or the like adapted to be suitably inserted in the socket member and which is connected with the wires or cables of the electric circuits controlled by the switch. The outside of the socket member is threaded to enable it to be secured to a suitable coupling and/or supporting conduit, pipe or structure, and thus support or aid in supporting the device. The projecting end 23 of end fitting 19 at the back of the plate 10 may likewise be connected to a suitable support to support or assist in supporting the device.

The bracket 55, as seen in Fig. 5 particularly, is a triangular-shaped plate having its rear upturned flange 57 extending across the back plate 10 and secured thereto by screws passing through the holes 58 in the back plate and threading into the ends of the bracket flange. The diagonal edges of the bracket plate are turned up to form strengthening flanges 59 on the bracket. Thus a strong supporting bracket is provided.

A cover 60 fits over and encloses the parts and is secured in position by screws 61, Fig. 2, at its rear side edges threading into angle brackets 62 spot-welded or otherwise secured to the back plate 10. At the bottom the cover is suitably slotted to pass around the socket pipe 54 and any coupling attached thereto. The edge of the cover follows the outline of the back plate 10 and when in place preferably falls just inside of same.

The manner of assembling the device will be apparent from the foregoing description of the construction and operation. The micrometer-like precision positioning of the switch-operating pin and bellows button so that they may operate on minute movements of thousandths of an inch and fractions of an ounce pressure and yet be rugged in construction to withstand rough handling after adjustment and vibration indefinitely in use, as on airplanes, is most important. The switch pin and bellows button may be relatively positioned so that they barely touch when there is no pressure in the bellows for operation at the slightest pressure or at a greater distance apart for operation at higher pressures. The mounting of all parts on a single plate, which, with the brackets firmly attached thereto, provides in effect a single rugged mounting structure for the operating bellows and switch to maintain their cooperative relationship under all conditions, is also important.

While the relay has been shown and described in the position shown in the drawing, it may be and frequently is used in the reverse position, or the other end up, or in an angular position, depending on the location in which it may be used and the positions of the cable and pressure conduits or other supports to which it is connected. It is self-contained and operates the same in any position.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. A device of the class described comprising a support, a low pressure bellows responsive to a small increment of pressure secured to said support, said bellows having a pushing contact surface at its free end, a sensitive pressure-responsive switch having an elongated enclosed casing mounted in front of the bellows and having an operating push pin extending toward said bellows surface, the mounting for the switch including a pair of spaced flat legs engaging the sides of said casing, a yoke over the free ends of the legs and switch with its legs lying against the outer faces of said flat mounting legs, bolts passing through all said legs and the switch casing firmly to clamp all together when the switch is in its final position, the bolt holes through the mounting legs adjacent their free ends being in the form of transverse slots to permit slight shifting of the switch therein, a second yoke over the ends of the legs and switch and firmly secured to said legs, an adjusting screw between the ends of said yokes, a relatively strong spring on said screw and tensioned to separate the yokes, said adjusting screw when the bolts are not tightened serving slightly to shift the position of the switch and its operating pin toward and from the bellows pushing surface, and screws in the support engaging the opposite end of the switch for tightening it in final position.

2. A device of the class described comprising a supporting back plate, a low pressure bellows secured at its open end to the back plate with a connection for operating pressure therethrough, a push plate at the free closed end of the bellows, a sensitive pressure-responsive switch having an operating push pin in front of the push plate of the bellows, brackets secured to the back plate and extending up along the opposite sides of the switch casing, means for adjustably securing said switch casing to said brackets, a member joining said brackets below said switch casing, adjustable means extending from said member to engage said switch casing at its bottom and to lock said switch casing against movement, and a cover fitting over all and detachably secured to the back plate.

3. A device of the class described comprising a rigid back plate, a bellows sensitive to small increments of pressure secured at one end to the back plate and having a pressure connection through the securing means, said bellows having a push contact member at its free closed end, a sensitive pressure-responsive switch having an enclosed casing and a protruding operating push pin in front of said contact member to be engaged thereby to operate the switch, a rugged bracket structure secured to said back plate and having members extending alongside said switch casing on opposite sides thereof, means to clamp said side members and switch casing together, a plate below said switch casing, said plate being secured to said bracket structure, and adjustable locking screws extending from said plate and engaging said switch casing.

4. A device of the class described comprising a mounting plate, a spring metal bellows sensitive to small increments of pressure carried by said mounting plate, a pressure connection at one end of said bellows, a push contact member carried at the free end of said bellows, a switch having a push pin substantially in front of said contact member to be engaged thereby to operate the switch upon pressure changes in said bellows, a bracket also carried by said mounting plate, and means for mounting said switch upon said bracket, said means including two extensions on said bracket, one of which is non-movably mounted and the other of which may swing with respect to the bracket to move said push pin of said switch relative to said push contact member of said spring metal bellows, and means for locking said switch against said swinging movement.

5. A device of the class described comprising a mounting plate, a spring metal bellows sensitive to small increments of pressure carried by said mounting plate, a pressure connection at one end of said bellows, a push contact member carried at the free end of said bellows, a switch having a push pin substantially in front of said contact member to be engaged thereby to operate the switch upon pressure changes in said bellows, a bracket also carried by said mounting plate, and means for mounting said switch upon said bracket, said means including two extensions on said bracket, one of which is non-movably mounted and the other of which may swing with respect to the bracket to move said push pin of said switch relative to said push contact member of said spring metal bellows, means for locking said switch against said swinging movement, a support rigid with respect to said bracket, and means carried by said support for locking said switch against vibratory movement in a direction substantially transverse to the direction of movement of its said push pin.

6. A device of the class described comprising a mounting plate, bellows sensitive to small increments of pressure carried by said mounting plate, a pressure connection at one end of said bellows, a switch including a housing therefor and an actuating push pin disposed axially with respect to said bellows, a push contact member at the free end of said bellows adapted to move upon a pressure change in said bellows to operate said push pin, and means for adjustably fixing the position of said push pin and for mounting said switch including bracket members for supporting said switch body and means for first adjustably tilting said switch body to adjust said push pin with respect to said bellows contact member and to lock the switch body against said swinging movement after a predetermined adjustment is made.

7. A device of the class described comprising a mounting plate, a bellows sensitive to small increments of pressure carried by said mounting plate, a pressure connection at one end of said bellows, a quick acting snap switch including a housing therefor and an actuating push pin disposed axially with respect to said bellows, a push contact member at the free end of said bellows adapted to move upon a pressure change in said bellows to operate said push pin, parallel bracket arms mounted rigidly with respect to said mounting plate, means for mounting said switch body between said parallel bracket arms, and a pair of yoke members embracing said bracket arms, one of said yoke members being fixed with respect to said bracket arms and the other of which is adjustably carried, and means between said yoke members for providing an adjustment for said switch body to provide an adjustment of its said push pin with respect to said bellows contact member.

8. A device of the class described comprising a mounting plate, a bellows sensitive to small increments of pressure carried by said mounting plate, a pressure connection at one end of said bellows, a switch including a housing therefor and an actuating push pin disposed axially with respect to said bellows, a push contact member at the free end of said bellows adapted to move upon a pressure change in said bellows to operate said push pin, parallel bracket arms mounted rigidly with respect to said mounting plate, means for mounting said switch body between said parallel bracket arms, a yoke member embracing said bracket arms, means for movably swinging said yoke member to swing said switch body to provide for an adjustment of said switch push pin with respect to said bellows contact member, and means for locking said yoke member and thus said switch body against said swinging movement.

WALTER C. HASSELHORN.

REFERENCES CITED

The following references are of record in the file of this patent:

UNITED STATES PATENTS

| Number | Name | Date |
|---|---|---|
| 2,033,410 | Dezotell | Mar. 10, 1936 |
| 2,033,417 | Dezotell | Mar. 10, 1936 |
| 2,094,319 | Faust | Sept. 28, 1937 |
| 2,174,050 | Willett | Sept. 26, 1939 |